United States Patent [19]

Kowalski

[11] Patent Number: 5,778,104
[45] Date of Patent: Jul. 7, 1998

[54] ADAPTIVE LUMINANCE-BASED FILTER

[75] Inventor: Stephen Vincent Kowalski, Rancho Palos Verdes, Calif.

[73] Assignee: Northrop Grumman Corporation, Los Angeles, Calif.

[21] Appl. No.: 670,248

[22] Filed: Jun. 19, 1996

[51] Int. Cl.[6] .................................................. G06T 5/00
[52] U.S. Cl. .................................... 382/261; 382/162
[58] Field of Search .............................. 382/261, 260, 382/264, 162, 275; 358/530, 532

[56] References Cited

U.S. PATENT DOCUMENTS

| | | |
|---|---|---|
| 4,685,068 | 8/1987 | Greco, II et al. . |
| 4,893,192 | 1/1990 | Takemura . |
| 5,010,580 | 4/1991 | Vincent et al. . |
| 5,050,222 | 9/1991 | Lee . |
| 5,075,788 | 12/1991 | Funada . |
| 5,280,367 | 1/1994 | Zuniga . |
| 5,295,202 | 3/1994 | Steinkirchner et al. . |
| 5,307,422 | 4/1994 | Wang . |
| 5,325,186 | 6/1994 | Ishizuka et al. . |
| 5,327,262 | 7/1994 | Williams . |
| 5,347,374 | 9/1994 | Fuss et al. . |
| 5,369,507 | 11/1994 | Tanaka et al. . |
| 5,379,130 | 1/1995 | Wang et al. . |
| 5,381,241 | 1/1995 | Kawanaka et al. . |
| 5,684,600 | 11/1997 | Miyazaki et al. ................ 358/530 |

*Primary Examiner*—Scott Rogers
*Attorney, Agent, or Firm*—Terry J. Anderson; Karl J. Hoch, Jr.

[57] ABSTRACT

The present invention is an adaptive luminance filter for filtering digital images. The present invention preserves annotation that is overlaid on a natural image background. Non-color specific filtering is used to preserve the clarity of the annotation. Images processed with the filter of the present invention are smoothed to varying degrees at each point in the image, depending on the luminance of the picture elements in the surrounding area. As a result, non-annotation areas are smoothed and annotation areas are left unfiltered. This allows higher than normal image quality to be produced and also allows the images to be compressed with greater efficiency.

18 Claims, 5 Drawing Sheets

ADAPTIVE LUMINANCE-BASED FILTER

BACKGROUND OF THE INVENTION

1. Field of the Invention

The present invention relates to an apparatus and method for adaptively filtering digital images containing annotation overlaid on a natural image background without degrading the quality of the annotation.

2. Related Art

Many different filtering techniques have been used to improve the quality of digital images by removing noise and smoothing out color variations. These techniques work well on natural images (pictures), but have difficulty with images that contain both natural images and annotation (text, lines, symbols, etc.). Annotation which was once crisp and well defined becomes blurred by the filtering operation.

Some techniques use color-specific filtering in that they attempt to preserve annotation by not filtering regions that contain known annotation colors. However, a difficulty with this approach is that the annotation colors and background colors must be known beforehand. Thus, current techniques do not effectively filter these types of images.

Yet other techniques attempt to extract the annotation from the background prior to filtering. The annotation is located and extracted and then the natural images are filtered separately. However, this technique is not efficient in that it requires excess resources and overhead. In addition, annotation not extracted because of inaccuracies in the annotation extraction process will be blurred by the filtering operation.

Therefore, what is needed is a non-color specific filter that effectively filters the natural image while preserving the clarity of the annotation so that non-annotation areas are smoothed and annotation areas are left unfiltered. What is additionally needed is a filter that does not extract the annotation. What is further needed is a filter that effectively and efficiently smoothes an image so that higher than normal image quality is produced.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is an adaptive luminance-based filter for filtering digital images containing annotation on a natural image background without extracting the annotation from the background. The digital images comprise a plurality of pixels or picture elements.

A non-color-specific filtering technique is used to filter the entire image to preserve the clarity of the annotation. Prior to the filtering operation, a filter size is selected, which is an odd number, preferably not less than three. Each pixel in the image is then filtered as follows. First, the luminance values of the pixel of interest and the surrounding neighborhood pixels are determined. Second, a first filter value is determined for the pixel of interest based on the pixel with the minimum luminance in the surrounding neighborhood. Third, a second filter value is calculated and assigned to all the pixels in the surrounding neighborhood. The first filter value is utilized to calculate the second filter value.

Fourth, the first and second filter values are utilized to calculate new color values for the pixel of interest. Last, the new color values are set for each color component in the pixel of interest. The above described process is continued for every pixel to thereby filter the entire image. As a result, non-annotation areas are smoothed and annotation areas are left unfiltered. This allows higher than normal image quality to be produced and also allows the images to be compressed with greater efficiency.

An advantage of the present invention is the ability to filter the natural image while preserving the clarity of the annotation so that non-annotation areas are smoothed and annotation areas are left unfiltered. Another advantage of the present invention is that higher than normal image quality is produced to allow the images to be compressed with greater efficiency.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
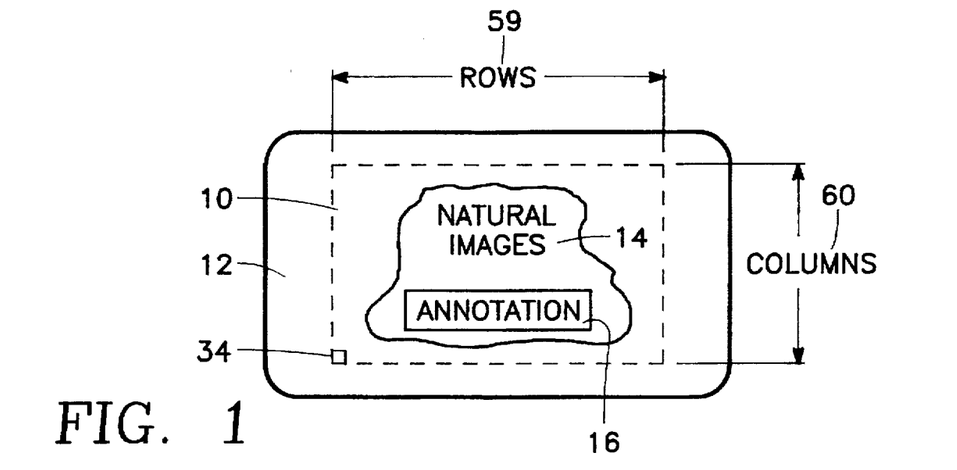
FIG. 1 is a digital color image with a natural image background overlaid with annotation.

FIG. 1 is a digital color image with a background containing natural images overlaid with annotation. Static digital images 10 can comprise a background 12 with solely natural images 14 (pictures) or solely annotation 16 (text, lines, and symbols, etc.), or a combination of natural images 14 and annotation 16. The quality of the digital image 10 often needs improvement. The adaptive luminance-based filter of the present invention improves the quality of digital images 10 that contain natural images 14 overlaid with annotation 16 by removing noise and smoothing out color variations. The digital image 10 is smoothed with non-color specific filtering in order to preserve the clarity of the annotation.

The annotation 16 is almost always darker (has less luminance) than the background 12 of the image 10 close to the annotation 16. Based on this, the adaptive luminance-based filter of the present invention smoothes the image 10 to varying degrees at each point in the image, depending on the luminance of the picture elements in the surrounding area. As a result, non-annotation areas are smoothed and areas with annotation 16 are left unfiltered. This produces higher than normal image quality and also allows the images 10 to be compressed with greater efficiency.

The adaptive luminance-based filter of the present invention is embodied in a process that filters the entire image 14 with a plurality of pixels or picture locations (as shown in detail in FIG. 5 below). The entire image 14 is filtered by performing two main steps at each picture location. The first step is the computation of the filter values and the second step is the application of the filter.

DETERMINATION OF FILTER SIZE

Figure 2:
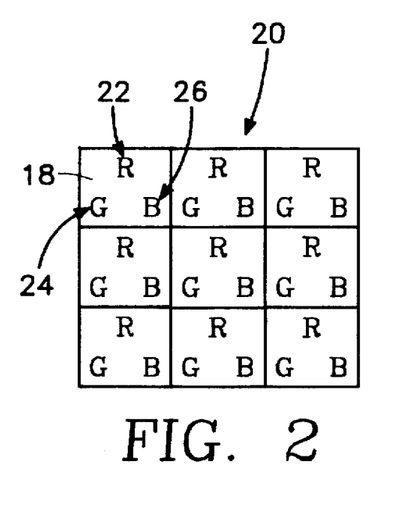
FIG. 2 is a portion of a color image in the form of a pixel neighborhood illustrating separate color components of each pixel.

FIG. 2 is an adaptive luminance-based filter of the present invention. The adaptive luminance-based filter is used to filter the color image. Prior to the filtering operation, a filter size 20 is selected. The filter size 20 is preferably square (the number of rows equal the number of columns) and preferably not less than three and odd in number. An odd number filter size 20 is preferred because it is desirable to have a pixel of interest (the current pixel being filtered) in the center of the filter. In the preferred embodiment, a filter size of 3×3 is utilized, however, any filter size can be used.

COLOR COMPONENTS

In FIG. 2, a portion of the color image 10 of FIG. 1 is depicted in the form of a pixel neighborhood 20 (the filter size) illustrating separate color components of each pixel. Color images 10 are typically comprised of either RGB (computer monitors), CYM (color printers), YIQ (color televisions), or HSV (canvas artists) color components. In the preferred embodiment, RGB color images are used.

Each pixel 18 of an RGB color image contains three components of color information, one for red 22, one for green 24, and one for blue 26. Each color component of digital color images 10 displayed and manipulated on color monitors typically has eight bits of color information. This translates to 256 possible color variations ($2^8$) for each color component. The 256 color variations are referred to as brightness variations. The 256 brightness variations with digital color images used on computer monitors, are represented by brightness values ranging from 0 to 255 (0 being the darkest and 255 being the brightest).

COMPUTATION OF LUMINANCE VALUES

Figure 3:
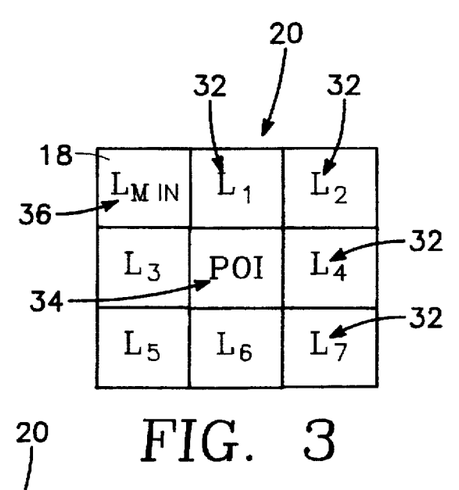
FIG. 3 is the pixel neighborhood of FIG. 2 illustrating separate luminance values of each pixel.

Luminance values for each pixel are determined before filtering the entire image. FIG. 3 is the pixel neighborhood 20 of FIG. 2 illustrating separate luminance values for each pixel. Each pixel 18 or picture element of the color image 10 has a property called luminance, which is a measure of the brightness of the image at that point. The luminance 32 of each picture element can be computed from its red 22, green 24, and blue 26 components using the following equation:

$$L=(0.299*R)+(0.587*G)+(0.114*B)$$

where L is the luminance of the pixel, and R, G, and B are the red, green, and blue components of a pixel, respectively. The maximum possible luminance, LMAX, depends on the color scale used for R, G, and B. In the preferred embodiment, the scale of 0 to 255 is used. From the above equation, LMAX is equal to 255.

OVERALL FILTERING PROCESS

Figure 4:
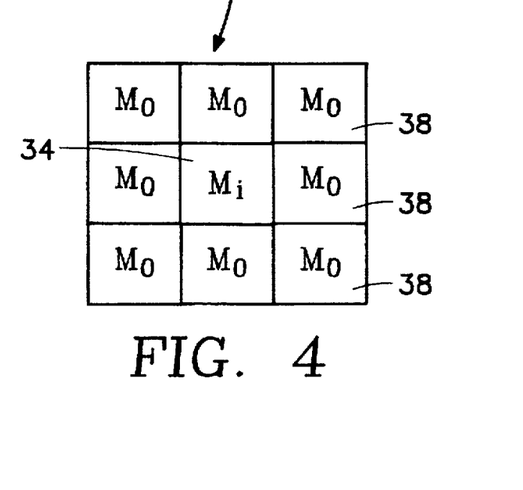
FIG. 4 is the pixel neighborhood of FIG. 2 illustrating the filter values of each pixel.
Figure 5:
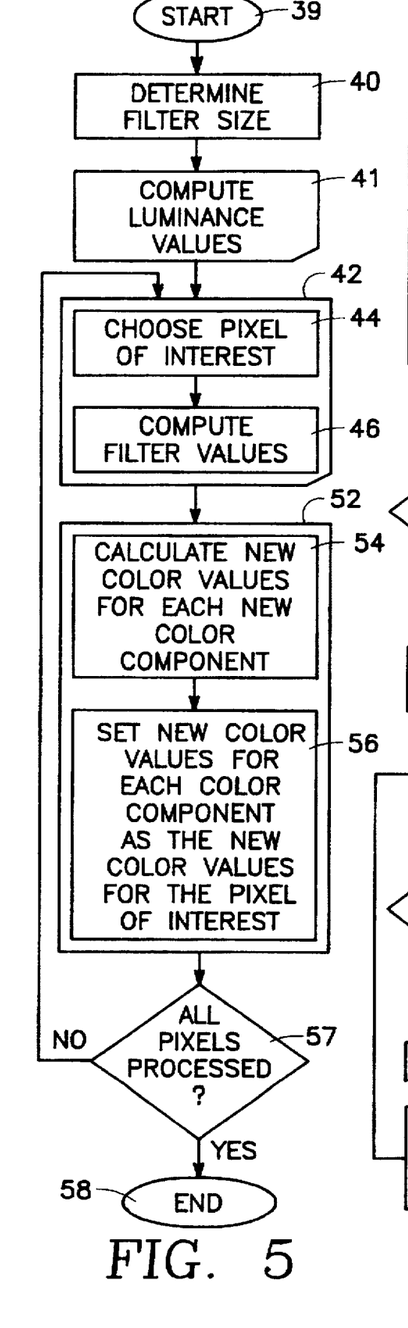
FIG. 5 is a flow diagram illustrating an overview of the filtering process in accordance with the present invention.

Referring to FIGS. 1–4 along with FIG. 5. FIG. 5 is a flow diagram illustrating an overview of the filtering process in accordance with the present invention. The filtering process is started 39 and then the filter size is determined 40 and luminance values for each pixel are computed 41 (as described generally above).

Next, each pixel in the image is filtered as follows. In the first main step 42, first a pixel of interest (POI) 34 with a surrounding neighborhood 20 is chosen 44. Second, filter values are computed 46. This is accomplished by determining a smallest luminance value, LMIN 36 in the neighborhood 20 surrounding the pixel of interest 34. For example, in the neighborhood 20 shown in FIG. 3, suppose the smallest luminance is $L_{min}$. $L_{min}$ is found in the picture element just above the pixel of interest that is being processed.

Referring back to FIG. 4, FIG. 4 shows the pixel neighborhood of FIG. 2 illustrating the filter values of each pixel. A filter value, Mi, is calculated for the pixel of interest 34 with the following equation:

$$Mi=1-[(8*LMIN)/(9*LMAX)]$$

where Mi is the filter value for the pixel of interest 34. One filter value is calculated and assigned to all the pixels 38 surrounding the pixel of interest 34 with the following equation:

$$Mo=(1-Mi)/8$$

where Mo is the filter value for the pixels 38 in the neighborhood 20, except the pixel of interest.

Notice that Mo=Mi=1/9 when LMIN=LMAX. This occurs when the neighborhood most probably does not have any annotation. If this occurs, the filter of the present invention reduces to a simple mean filter. Also notice that Mi=1 and Mo=0 when LMIN=0. This occurs when the neighborhood probably contains annotation. During this occurrence, the filter has no affect on the pixel of interest. It should be noted that Mi varies linearly from 1/9 to 1 as LMIN goes from LMAX to 0. Because the values of the filter change depending on the luminance in the neighborhood, the filter of the present invention is an adaptive luminance-based filter.

APPLICATION OF FILTER

In the second main step 52, the filter values that were just computed are utilized to calculate 54 new color values for the pixel of interest. In the preferred embodiment, the color components of the image are red, green, and blue (RGB) and are processed separately. Each new color value for the pixel of interest is determined by first multiplying each color value of each picture element in the neighborhood by its corresponding filter value. Next, these calculated values are summed to produce new picture element color values for the pixel of interest. The new picture element color values are set 56 for each color component.

For instance, for RGB, first the red color value of the pixel of interest is multiplied by Mi, while the red color value of each surrounding pixel is multiplied by Mo. Second, these calculated values are summed. The same calculations are repeated for the green and blue color components to determine the new red, green, and blue color values for the pixel of interest. Alternatively, the image could be processed in a different color space, such as CYM, YIQ, or HSV.

After the second main step 52, the filter determines whether all the pixels have been processed 57. If all the pixels have not been processed, the two main steps 46, 52 are continued for each pixel in the entire image. If all the pixels have been processed, filtering of the entire image is complete 58.

EXTENSION TO LARGER FILTER SIZES

The neighborhood for the filter could be extended to an arbitrary size. One method would be to equally weight all neighborhood pixels except the center pixel. If the size of the filter is SIZE×SIZE, the values for Mi and Mo would be as follows:

$$Mi = 1 - [(SIZE-1)*LMIN)/(SIZE*LMAX)$$

$$Mo = (1-Mi)/(SIZE-1)$$

Another method would be to vary the weights of the neighboring locations so that the further away from the center, the less the weight.

FIGS. 6–12 below describe the detailed processes embodied in the present invention.

ALGORITHM WITH MODULES

Figure 6:
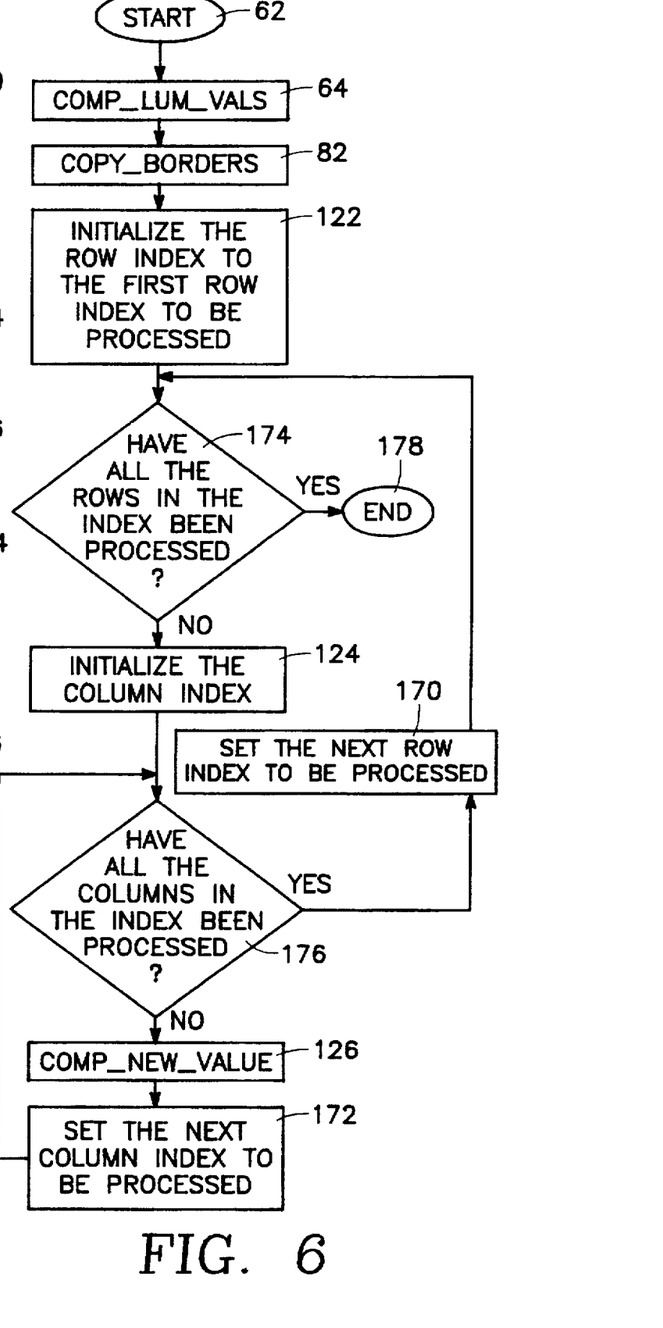
FIG. 6 is a flow diagram illustrating the FILTER_IMAGE algorithm of the present invention

FIG. 6 is a flow diagram illustrating the FILTER_IMAGE algorithm of the present invention. The algorithm of the present invention uses the following arguments (along with their respective definitions): Lum 20 (a 2 dimensional array of luminance values); NumRows 59 (the number of rows in the array); NumCols 60 (the number of columns in the array); ImageIn 10 (the color image being processed); ImageOut (an output image produced by the filter); x (a variable row location in the NumRows); and y (a variable column location in the NumCols).

Figures 7, 8:
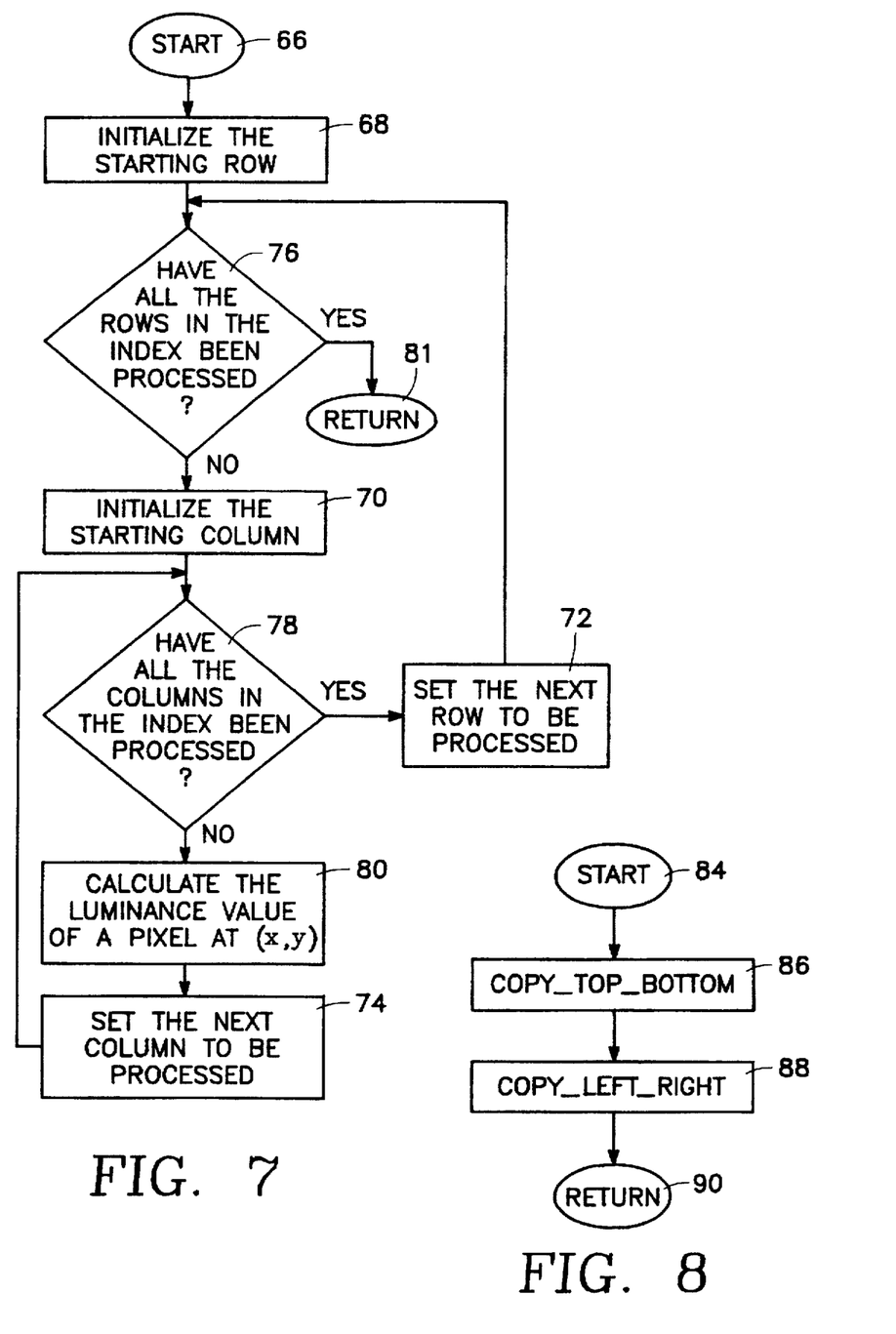
FIG. 7 is a flow diagram illustrating the COMP_LUM_VALS module of the present invention.
FIG. 8 is a flow diagram illustrating the COPY_BORDERS module of the present invention.

The FILTER_IMAGE algorithm starts 62 by first inputting the color image to be processed. Second, the COMP_LUM_VALS 64 module is called. Referring to FIG. 7, a flow diagram illustrating the COMP_LUM_VALS module of the present invention is shown. The COMP_LUM_VALS module starts and then 66 traverses through the array to determine the Lum values of each pixel. It should be noted that the border pixels in the image are not filtered because the border pixels do not have a complete neighborhood. Thus, the border pixels are merely copied from the image being input to the output image without any processing.

This is accomplished by initializing the starting row 68 and initializing the starting column 70 by setting the row and column locations of the array to start at 0.0 by initializing x=1 and y=1. Succeeding rows and columns of the array are then processed by consecutively resetting 72, 74 the row and column locations by re-initializing x=x+1 and y=y+1, respectively. The module constantly monitors the rows and columns to determine whether all of the rows and columns have been processed 76, 78 by checking if x>=NumRows and y>=NumCols, respectively. The following equation is used to calculate 80 Lum for each x and y pixel location in the array: Lum|x| |y|=0.299*ImageIn.R|x| |y|+ 0.587*ImageIn.G[x] [y]+0.114* ImageIn.B[x] [y] where R, G, and B are the color components for an RGB color image. When all of the rows and columns have been processed, the module returns 81 to the main algorithm.

Figure 9:
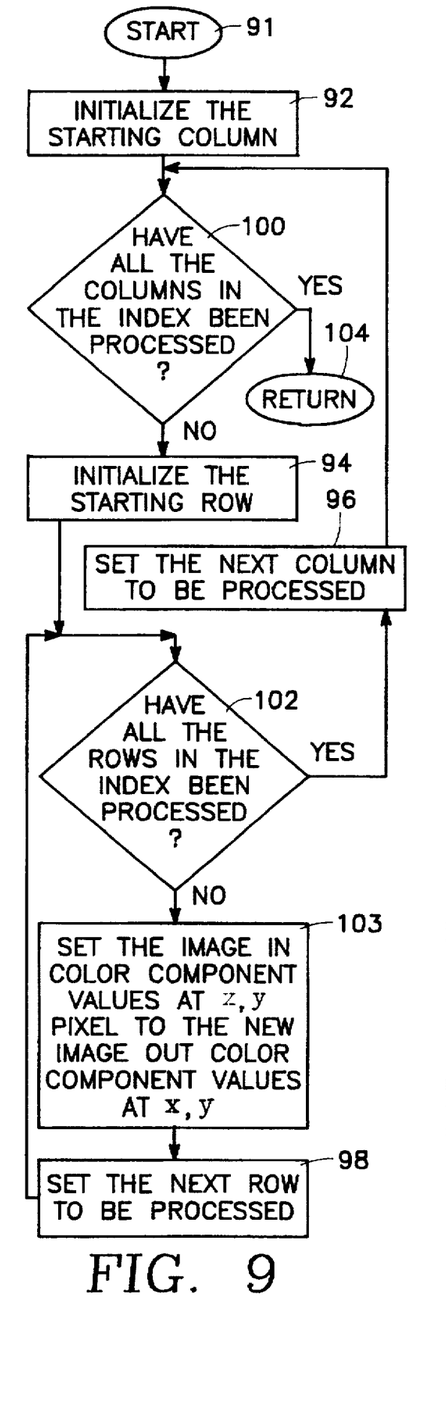
FIG. 9 is a flow diagram illustrating the COPY_TOP_BOTTOM sub-module of the COPY_BORDERS module of the present invention.
Figure 10:
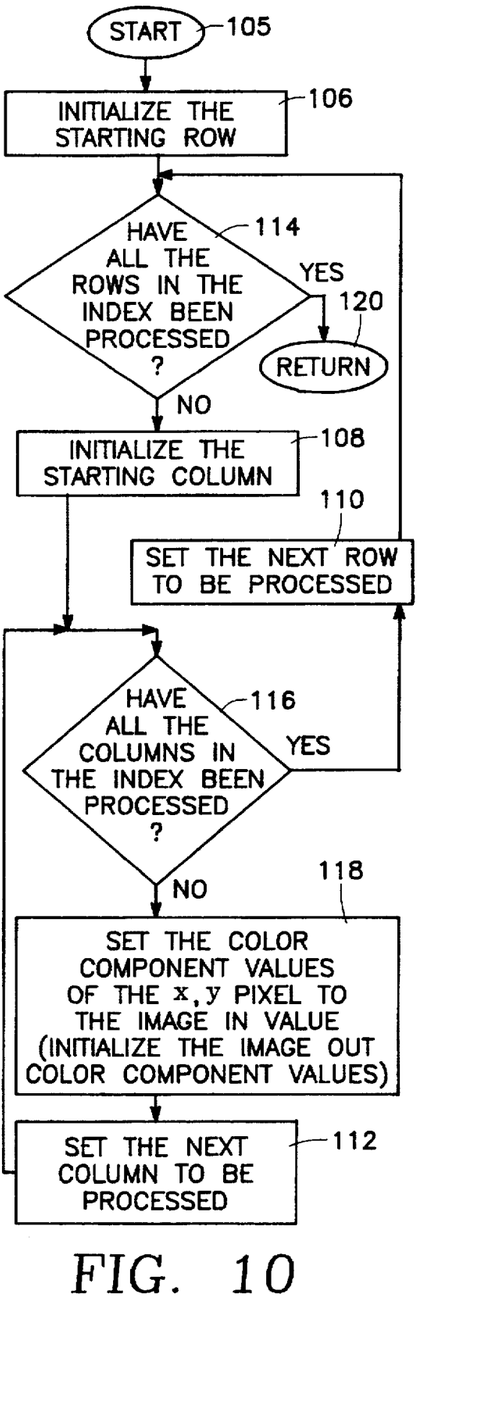
FIG. 10 is a flow diagram illustrating the COPY_LEFT_RIGHT sub-module of the COPY_BORDERS module of the present invention.

Third, the COPY_BORDERS module is called. Referring to FIG. 8, a flow diagram illustrating the COPY_BORDERS module is shown. The COPY_BORDERS module starts 54 and then calls 86, 88 the COPY_TOP_BOTTOM sub-module and the COPY_LEFT_RIGHT sub-module. When done, the module returns 90. FIG. 9 is a flow diagram illustrating the COPY_TOP_BOTTOM sub-module of the COPY_BORDERS module and FIG. 10 is a flow diagram illustrating the COPY_LEFT_RIGHT sub-module of the COPY_BORDERS module. The COPY_TOP_BOTTOM sub-module copies the top and bottom borders and the COPY_LEFT_RIGHT sub-module copies the left and right borders of the ImageIn to be top and bottom and left and right borders, respectively, of the new ImageOut.

The COPY_TOP_BOTTOM sub-module accomplishes this by starting 91 and then setting the row and column locations of the array to start at 0.0 by initializing x=0 and y=0, 92, 94 respectively. Top and bottom border rows of the array are then processed by consecutively resetting 96 row locations to be border rows by re-initializing x=x+ NumRows−1. Each column is processed by consecutively resetting 98 the column locations by re-initializing y=y+1. As a result with this dual counter, only the top and bottom borders are processed. The module constantly monitors 100, 102 the rows and columns to determine whether all of the top and bottom borders have been processed by checking if x>=NumRows and y>=NumCols, respectively. The new top and bottom borders for Imageout are determined by setting 103:

Imageout.R[x] [y]=ImageIn.R[x] [y]

Imageout.G[x] [y]=ImageIn.G[x] [y]

Imageout.B[x] [y]=ImageIn.B[x] [y]

where R, G, and B are the color components for an RGB color image. When both the top and bottom borders have been processed, the module returns 104.

Likewise, the COPY_LEFT_RIGHT sub-module starts 105 and then copies the left and right borders by setting 106, 108 the column and row locations of the array to start at 0.0 by initializing y=0 and x=0, respectively. Left and right border columns of the array are then processed by consecutively resetting 110 column locations to be border columns by reinitializing y=y+NumCols−1. Each row is processed by consecutively resetting 112 the row locations by reinitializing x=x+1. As a result with this dual counter, only the left and right borders are processed. The module constantly monitors 114, 116 the columns and rows to determine whether all of the left and right borders have been processed by checking if x>=NumRows and y>=NumCols, respectively. The new left and right borders for Imageout are determined by setting 118:

Imageout.R[x] [y]=ImageIn.R[x] [y]

ImageOut.G[x][y]=ImageIn.G[x][y]

ImageOut.B[x][y]=ImageIn.B[x][y]

where R, G, and B are the color components for an RGB color image. When both the left and right borders have been processed, the module returns 120.

Fourth, after the top, bottom, left, and right borders have been processed and created in the ImageOut, the inner pixels are processed. This is accomplished by initializing the row and column indices 122, 124 by setting the row and column locations of the array to start at 1,1 by initializing x=1 and y=1, respectively.

Figures 11, 12, 13:
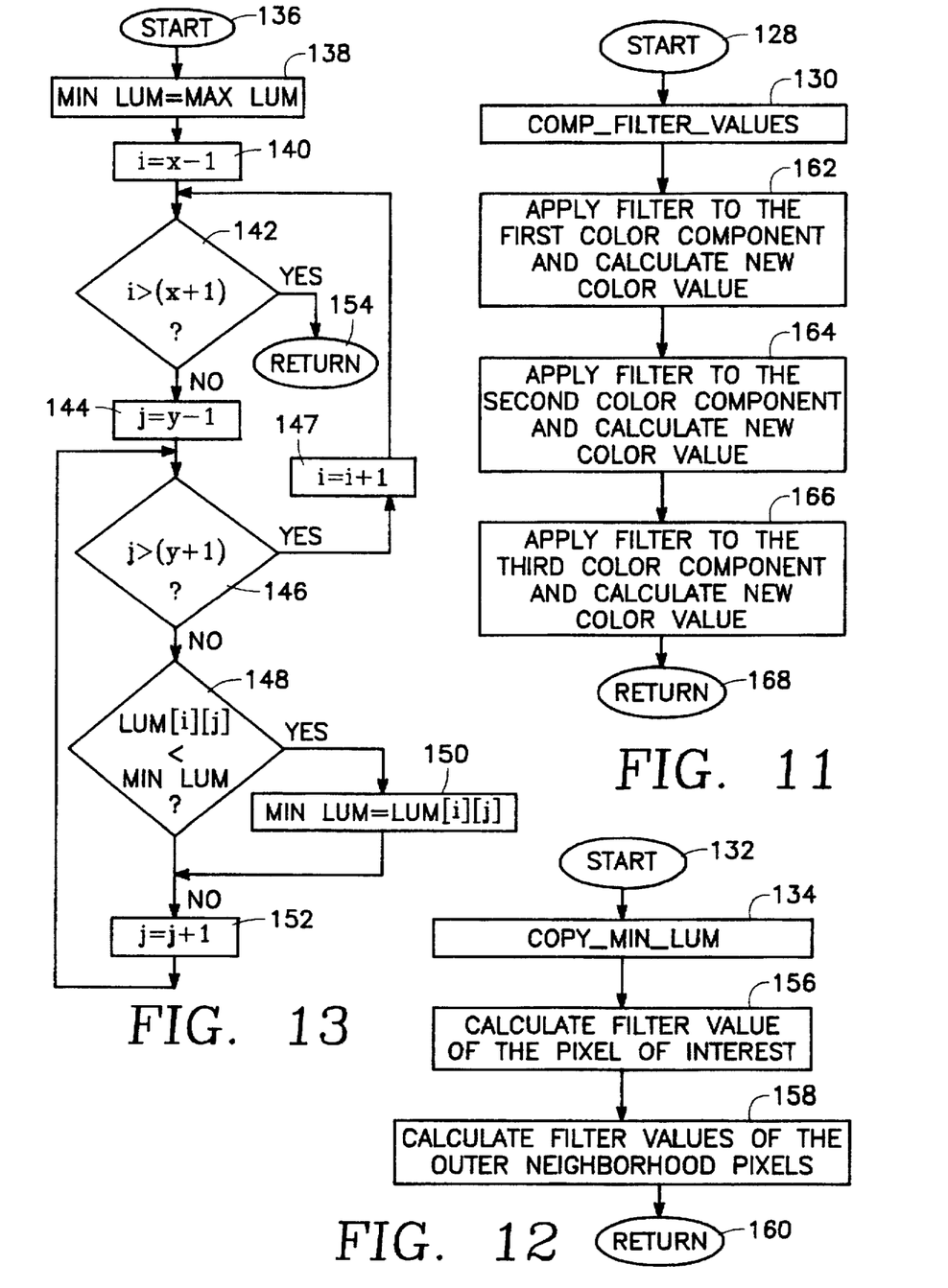
FIG. 11 is a flow diagram illustrating the COMP_NEW_VALUE module of the present invention.
FIG. 12 is a flow diagram illustrating the COMP_FILTER_VALS sub-module of the COMP_NEW_VALUE module of the present invention.
FIG. 13 is a flow diagram illustrating the COMP_MIN_LUM algorithm of the COMP_FILTER_VALS sub-module of the COMP_NEW_VALUE module of the present invention.

Fifth, the COMP_NEW_VALUE module is called 126. FIG. 11 is a flow diagram illustrating the COMP_NEW_VALUE module of the present invention. The COMP_NEW_VALUE starts 128 and then computes new color values for each pixel of the ImageOut. But first the COMP_NEW_VALUE calls 130 the COMP_FILTER_VALS sub-module to calculate the filter values, including Mi and Mo. FIG. 12 is a flow diagram illustrating the COMP_FILTER_VALS sub-module of the COMP_NEW_VALUE module. The COMP_FILTER_VALS sub-module starts 132 and then calls 134 the COMP_MIN_LUM sub-module to determine the pixel with the minimum luminance so that the COMP_FILTER_VALS can compute Mi and Mo. FIG. 13 is a flow diagram illustrating the COMP_MIN_LUM sub-module of the COMP_FILTER_VALS sub-module of the COMP_NEW_VALUE module.

The COMP_MIN_LUM sub-module starts 136 and then traverses through the array to determine the pixel location with the minimum luminance. One way to determine the minimum luminance of the array is to use counting variables i and j to traverse and inspect the array, as shown in FIG. 13. The steps of FIG. 13 are as follows. First set 138 MinLum=MaxLum, second set 140 i=x-1, third check 142 if i>(x+1) and return 154 to COMP_NEW_VALUE module if it is, if not, set 144 j=y-1. Fourth, check 146 if j>(y+1) and set 147 i=i+1 and then go to step 142. If not, check 148 if Lum[i][j]<MinLum and then first set 150 MinLum=Lum[i][j], second set 152 j=j+1, and then return to step 146 if Lum[i][j]<MinLum. If Lum[i][j]<MinLum then go directly to step 152.

The counting variables i and j are temporary row and column counting variables, respectively. MinLum is the pixel with the minimum luminance, and MaxLum is the constant maximum luminance, which is 255 for an 8 bit RGB color image. The sub-module returns 154 when the pixel with the minimum luminance is found.

Referring back to FIG. 12, once the pixel with the minimum luminance is found, the filter values, Mi and Mo are calculated 156, 158 with the following equations:

$$Mi=1-[(SIZE-1)*MinLum)/(SIZE*MaxLum)]$$

$$Mo=(1-Mi)/(SIZE-1)$$

where SIZE is number of rows or columns of pixels in the filter (assuming the number of rows equals the number of columns), Mi is the filter value for the pixel of interest, and Mo is the filter value for all of the pixels in the neighborhood of the pixel of interest. When done, the sub-module returns 160.

Referring back to FIG. 11, once the Mi and Mo values are calculated, new color values for the pixel of interest are calculated 162, 164, 166 for the ImageOut, for each color component, with the following equation:

$$ImageOutC[x][y]=Mi*ImageIn.C[x][y]+Mo*ImageIn.C[x-1][y-1]+$$
$$Mo*UmageIn.C[X-1][y]+Mo*ImageIn.C[x-1][y+1]+$$
$$Mo*Image.C[x][y-1]+Mo*ImageIn.C[x][y+1]+Mo*ImageIn.C[x+1][y-1]+Mo*ImageIn.C[x+1][y]+Mo*ImageIn.C[x+1][y+1]$$

where C is each color component. Since the preferred embodiment utilizes RGB color images, RGB would be substituted for C in the above equation so that ImageoutR[x][y], ImageOutG[x][y], and ImageOutB[x][y], where R, G, and B are the red, green, and blue color components of the image, respectively. When done, the sub-module returns 168.

Every pixel is processed in accordance with the above steps by consecutively resetting the row and column locations by re-initializing x=x+1 and y=y+1, respectively, for succeeding rows and columns of the array. The module constantly monitors 174, 176 the rows and columns to determine whether all of the rows and columns have been processed by checking if x>=NumRows-1 and y>=NumCols-1, respectively. When all of the rows and columns have been processed, the algorithm is done 178.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An adaptive luminance-based filter for adaptively filtering digital images comprised of a plurality of pixels, said adaptive luminance-based filter comprising:

a computer having memory, wherein said digital images are stored in said memory as data representing pixel values of said digital images;

said computer being preprogrammed to compute data luminance values for each pixel in said digital images, and a pixel of interest having color components, wherein said pixel of interest is surrounded by a neighborhood of pixels corresponding to said filter size;

said computer using said luminance values to compute new color values of said pixel of interest;

said computer being preprogrammed to set said new color values for each color component in said pixel of interest;

said luminance values including maximum luminance values and minimum luminance values; and     said computer using said minimum luminance values to compute a first filter value, said computer using said first filter value to compute a second filter value, and said computer using said first and second filter values to compute said new color values of said pixel of interest.

2. A computer-readable medium for causing a computer to function as an adaptive luminance-based filter for adaptively filtering digital images comprised of a plurality of pixels, comprising:

a computer-readable storage medium;

a computer program stored on said medium;

said computer program having an interface for accessing a database containing data associated with said digital images representing pixel values of said digital image;

said computer program having an initial processing module for selecting a filter size and for determining luminance values for each pixel in said digital image;

said computer program having a secondary processing module for selecting a pixel of interest having color components, wherein said pixel of interest is surrounded by a neighborhood of pixels corresponding to said filter size, and for utilizing said luminance values to compute new color values of said pixel of interest;

said initial processing module and said secondary processing module being coupled to said interface for causing said new color values to be set for each color component in said pixel of interest;

wherein said computer-readable storage medium with said computer program stored thereon function to cause a computer to function as an adaptive luminance-based filter that adaptively filters digital images;

said secondary processing module utilizing said luminance values to ascertain maximum luminance values and minimum luminance values; and said secondary processing module comprising a means for calculating a first filter value by utilizing said minimum luminance values, for calculating a second filter value by utilizing said first filter value, and for calculating said new color values of said pixel of interest by utilizing said first and second filter values.

3. A computer implemented process for adaptively filtering digital images comprised of a plurality of pixels, said implemented process comprising the steps of:

(a) selecting a filter size;

(b) determining a luminance value for each pixel in the digital image;

(c) selecting a pixel of interest having color components, wherein said pixel of interest is surrounded by a neighborhood of pixels corresponding to said filter size;

(d) calculating new color values of said pixel of interest by utilizing said luminance values;

(e) wherein step (d) comprises utilizing said luminance value to ascertain a maximum luminance value and a minimum luminance value;

(f) after step (d), the step of calculating a first filter value by utilizing said minimum luminance value, and the step of calculating a second filter value by utilizing said first filter value; and (g) setting said new color values for each color component in said pixel of interest.

4. An adaptive luminance-based filter for adaptively filtering digital images comprised of a plurality of pixels, said adaptive luminance-based filter comprising:

a computer having memory, wherein said digital images are stored in said memory as data representing pixel values of said digital images;

said computer being preprogrammed to compute data luminance values for each pixel in said digital images, and a pixel of interest having color components, wherein said pixel of interest is surrounded by a neighborhood of pixels corresponding to said filter size;

said computer using said luminance values to compute new color values of said pixel of interest;

said computer being preprogrammed to set said new color values for each color component in said pixel of interest;

said luminance values including a minimum luminance value;

said computer using said minimum luminance value and a maximum luminance value to compute first and second filter values; and said computer using said first and second filter values to compute said new color values of said pixel of interest.

5. The adaptive luminance-based filter of claim 4 wherein said computer uses said first filter value to compute a filtered pixel of interest and said second filter value to compute filtered neighborhood pixels and wherein said computer uses said filtered pixel of interest and said filtered neighborhood pixels to compute said new color values of said pixel of interest.

6. A computer-readable medium for causing a computer to function as an adaptive luminance-based filter for adaptively filtering digital images comprised of a plurality of pixels, comprising:

a computer-readable storage medium;

a computer program stored on said medium;

said computer program having an interface for accessing a database containing data associated with said digital images representing pixel values of said digital image;

said computer program having an initial processing module for selecting a filter size and for determining luminance values for each pixel in said digital image;

said computer program having a secondary processing module for selecting a pixel of interest having color components, wherein said pixel of interest is surrounded by a neighborhood of pixels corresponding to said filter size, and for utilizing said luminance values to compute new color values of said pixel of interest;

said initial processing module and said secondary processing module being coupled to said interface for causing said new color values to be set for each color component in said pixel of interest;

wherein said computer-readable storage medium with said computer program stored thereon function to cause a computer to function as an adaptive luminance-based filter that adaptively filters digital images;

said secondary processing module utilizing said luminance values to ascertain minimum luminance values; and said secondary processing module further comprising a means for calculating a first filter value by utilizing said minimum luminance values;

said secondary processing module comprising a means for calculating a second filter value by utilizing said minimum luminace values;

said secondary processing module further comprising a means for calculating said new color values of said pixel of interest by utilizing said first and second filter values; and said means for calculating said new color values of said pixel of interest utilizes said first filter value to compute a filtered pixel of interest and said second filter value to compute filtered neighborhood pixels.

7. The computer-readable medium of claim 6 wherein said means for calculating said new color values of said pixel of interest utilizes said filtered pixel of interest and said filtered neighborhood pixels to compute said new color values of said pixel of interest.

8. A computer implemented process for filtering digital images comprised of a plurality of pixels, the process comprising the steps of:

a) selecting a filter size;

b) selecting a pixel of interest, the pixel of interest being surrounded by a neighborhood of pixels corresponding to the selected filter size;

c) determining a luminance value for the pixel with the minimum luminance in the neighborhood;

d) determining a maximum possible luminance for the pixels comprising the image;

e) selecting a first and a second filter value utilizing the minimum luminance value and the maximum possible luminance value;

f) filtering the pixel of interest using the first filter value;

g) filtering the pixels in the neighborhood using the second filter value;

h) summing the filtered pixel of interest and the filtered pixels in the neighborhood; and i) setting the pixel of interest to a new value based on the sum of the filtered pixel of interest and the filtered pixels in the neighborhood.

9. The computer implemented process of claim 8 wherein the first and second filter values are selected so that when the minimum luminance value indicates that the neighborhood contains annotation, the step of summing yields a new pixel value equal to the value of the unfiltered pixel of interest.

10. The computer implemented process of claim 8 wherein the first filter value is selected so that when the minimum luminance value indicates that the neighborhood contains annotation, the first filter has no affect on the pixel of interest.

11. The computer implemented process of claim 10 wherein the second filter value is selected so that when the minimum luminance value indicates that the neighborhood contains annotation, the filtered pixels in the neighborhood to are set to zero thereby causing the step of summing to yield the new pixel value equal to the value of the unfiltered pixel of interest.

12. A computer implemented process for filtering digital images comprised of a plurality of pixels, the process comprising the steps of:

a) selecting a filter size;

b) selecting a pixel of interest, the pixel of interest being surrounded by a neighborhood of pixels corresponding to the selected filter size;

c) selecting a first filter value;

d) selecting a second filter value;

e) filtering the pixel of interest using the first filter value;

f) filtering each pixel in the neighborhood using the second filter value;

g) calculating a new value for the pixel of interest based on the filtered pixel of interest and the filtered pixels in the neighborhood; and h) setting the pixel of interest to the new value.

13. The computer implemented process of claim 12 wherein the new value for the pixel of interest is calculated by summing the filtered pixel of interest and the filtered pixels in the neighborhood.

14. The computer implemented process of claim 12 wherein the pixels in the neighborhood have a minimum luminance value and a maximum possible luminance value and wherein the first filter value is selected such that it utilizes the minimum luminance value and the maximum possible luminace value.

15. The computer implemented process of claim 14 wherein the second filter value is selected such that it utilizes the minimum luminance value and the maximum possible luminace value.

16. The computer implemented process of claim 12 wherein the pixels in the neighborhood have a minimum luminance value and wherein the first and second filter values are selected so that when the minimum luminance value indicates that the neighborhood contains annotation, the step of calculating yields the new value of the pixel of interest equal to the value of the unfiltered pixel of interest.

17. The computer implemented process of claim 12 wherein the first filter value is selected so that when the minimum luminance value indicates that the neighborhood contains annotation, the first filter has no affect on the pixel of interest.

18. The computer implemented process of claim 17 wherein the second filter value is selected so that when the minimum luminance value indicates that the neighborhood contains annotation, the filtered pixels in the neighborhood to are set to zero thereby causing the step of calculating to yield the new value for the pixel of interest equal to the value of the unfiltered pixel of interest.

* * * * *